(12) United States Patent
Bum

(10) Patent No.: US 6,285,685 B1
(45) Date of Patent: Sep. 4, 2001

(54) APPARATUS AND METHOD FOR PROVIDING PC COMMUNICATION AND INTERNET SERVICE BY USING SETTOP BOX

(75) Inventor: Jae-Ryong Bum, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/084,447

(22) Filed: May 27, 1998

(30) Foreign Application Priority Data

Jun. 26, 1997 (KR) .................................. 97-27548

(51) Int. Cl.⁷ .................................................. H04L 12/56
(52) U.S. Cl. ........................... 370/474; 370/471; 370/493; 370/392; 370/395; 725/14.13; 725/87; 725/100; 725/110; 725/131; 725/151
(58) Field of Search .................................... 370/471, 474, 370/493, 392, 395; 725/14.13, 87, 100, 110, 131, 151

(56) References Cited

U.S. PATENT DOCUMENTS

| | | |
|---|---|---|
| 5,488,412 | 1/1996 | Majeti et al. ............................ 348/10 |
| 5,579,308 | 11/1996 | Humpleman . |
| 5,701,451 * | 12/1997 | Rogers et al. ......................... 395/600 |
| 5,790,171 * | 8/1998 | Klopfer et al. ......................... 348/6 |
| 5,790,753 * | 8/1998 | Krishnamoorthy et al. ..... 395/200.33 |
| 5,812,786 * | 9/1998 | Seazholtz et al. ............... 395/200.63 |
| 5,949,795 * | 9/1999 | Moroney et al. ...................... 370/516 |

FOREIGN PATENT DOCUMENTS

| | | | |
|---|---|---|---|
| A1 195 42 780 | 5/1997 | (DE) ............................... H04L/12/00 |

* cited by examiner

Primary Examiner—Hassan Kizou
Assistant Examiner—Thien D Tran
(74) Attorney, Agent, or Firm—Sughrue, Mion, Zinn, Macpeak & Seas, PLLC

(57) ABSTRACT

An apparatus and method for supporting a PC communication and internet service while supporting D-CATV and VOD services by using a settop box connected to a network for D-CATV and VOD services, without a separate communication equipment. The apparatus includes a PC interface installed in the settop box to communicate with the PC; and an internet gateway prepared at a head end of the D-CATV to provide an internet service channel between a backbone internet and a D-CATV subscriber. The settop box includes a controller for analyzing a previously designated VC (Virtual Channel) cell for SLIP (Serial Line Internet Protocol) within of data received from the network and for transmitting the VC cell together with a SLIP header to the PC. The controller also is for separating the SLIP header from the data received from the PC and for transmitting to the network the designated VC cell together with an IP (Internet Protocol)-over-ATM (Asynchronous Transfer Mode) header.

17 Claims, 2 Drawing Sheets

APPARATUS AND METHOD FOR PROVIDING PC COMMUNICATION AND INTERNET SERVICE BY USING SETTOP BOX

BACKGROUND OF THE INVENTION

1. Field of the Invention

The present invention relates to digital cable television (hereinafter, referred to as "D-CATV") and video-on-demand (hereinafter, referred to as "VOD") services, and in particular, to an apparatus and method for providing a PC-to-PC (Personal Computer) communication and internet service by using a settop box for D-CATV and VOD services.

2. Description of the Related Art

Digital VOD systems based on the use of existing analog CATV networks and the application of ATM (Asynchronous Transfer Mode) techniques is presently under study. Such a digital VOD system employs an MPEG-2 (Moving Picture Experts Group 2) technique to digitize a video signal, and the ATM technique to distribute the signals. Further, such digital VOD system uses a CATV installation (i.e., coaxial cable or optical cable) to transmit signals between a VOD server and a settop box installed at a user's home. Typically, the modulation-demodulation circuit for the digital VOD system should employ a 64-QAM (Quadrature Amplitude Modulation) modulation, a VBS (Vestigial Side-Band) modulation, and a QPSK (Quadrature Phase Shift Keying) modulation.

The various network access techniques that may be used for the CATV and VOD services are classified as an ADSL (Asymmetric Digital Subscriber Line) network, an HFC (Hybrid Fiber Coax) network, an FTTC (Fiber To The Curb) network, an active NT (Network Terminator) network, and a radio (satellite) access network. The HFC network uses an optical fiber for a trunk line and a coaxial cable for a subscriber line installed at the subscriber's home, based on a frequency multiplexing. The FTTC network uses the optical fiber up to the subscriber's home, and the coaxial or helical pair cable at the subscriber's home, based on a digital transmission. The active NT network terminates the network at the network terminator and distributes the signal within an office or facility.

A settop box that is connected to the FTTC network only provides a digital CATV service. Thus, the settop box for the FTTC network must include an ethernet interface if it is desired to have access to an internet service by using the settop box and a PC. In such case, the PC should also include an ethernet card to provide the ethernet service. This results in a high cost since an operator must maintain ethernet interface cards that are installed at both the settop box and the PC.

Further, in order for the FTTC network to support the internet service, the PC should include an ATM interface card, in addition to the settop box for the D-CATV service, which increases the cost. Moreover, because of the possibility of PC ATM interface card trouble, the operator should also maintain the PC ATM interface card separately.

Conventionally, one may use the PC communication and internet service based on the PSTN (Public Switched Telephone Network) network. In this case, the PC should include a modem, and the internet service is not available while the telephone line is engaged.

SUMMARY OF THE INVENTION

It is therefore an object of the present invention to provide an apparatus and method for supporting a PC communication and internet service while supporting D-CATV and VOD services by using a settop box connected to a network for D-CATV and VOD services, without the need for separate communication equipment.

It is another object of the present invention to provide an apparatus and method for supporting a PC communication and internet service while supporting a D-CATV service by using a settop box and a PC in an FTTC network, without a separate modem, in which a telephone line for voice communication is used, as it is, for a voice communication service.

According to an aspect of the present invention, an apparatus for providing a PC communication and internet service by using a settop box connected to a network for D-CATV (Digital Cable Television) and VOD (video-On-Demand) services includes a PC interface installed in the settop box to communicate with the PC; and an internet gateway prepared at a head end of the D-CATV to provide an internet service channel between a backbone internet and a D-CATV subscriber. The settop box includes a controller for analyzing a previously designated VC (Virtual Channel) cell for the presence of a SLIP (Serial Line Internet Protocol) among data received from the network, where the VC cell was transmitted together with a SLIP header, and separating the SLIP header from the data received from the PC so that the designated VC cell can be transmitted to the network together with an IP (Internet Protocol)-over-ATM (Asynchronous Transfer Mode) header.

According to another aspect of the present invention, there is a method for providing a PC communication and internet service by using a settop box connected to a network for D-CATV and VOD services. The method includes the steps of: connecting a head end of the D-CATV and a center of the VOD to a backbone internet; assigning inherent IP (Internet Protocol) addresses to the settop box and a PC connected to the settop box via an RS-232C interface; and analyzing a previously designated VC cell for SLIP associated with data received from the network to transmit the VC cell together with a SLIP header, and separating the SLIP header from the data received from the PC so that the designated VC cell can be transmitted to the network together with an IP-over-ATM header.

BRIEF DESCRIPTION OF THE DRAWINGS

The above and other objects, features and advantages of the present invention will become more apparent in the light of the following detailed description of an exemplary embodiment, provided with reference to the attached drawings in which.

DETAILED DESCRIPTION OF THE PREFERRED EMBODIMENT

Figure 1:
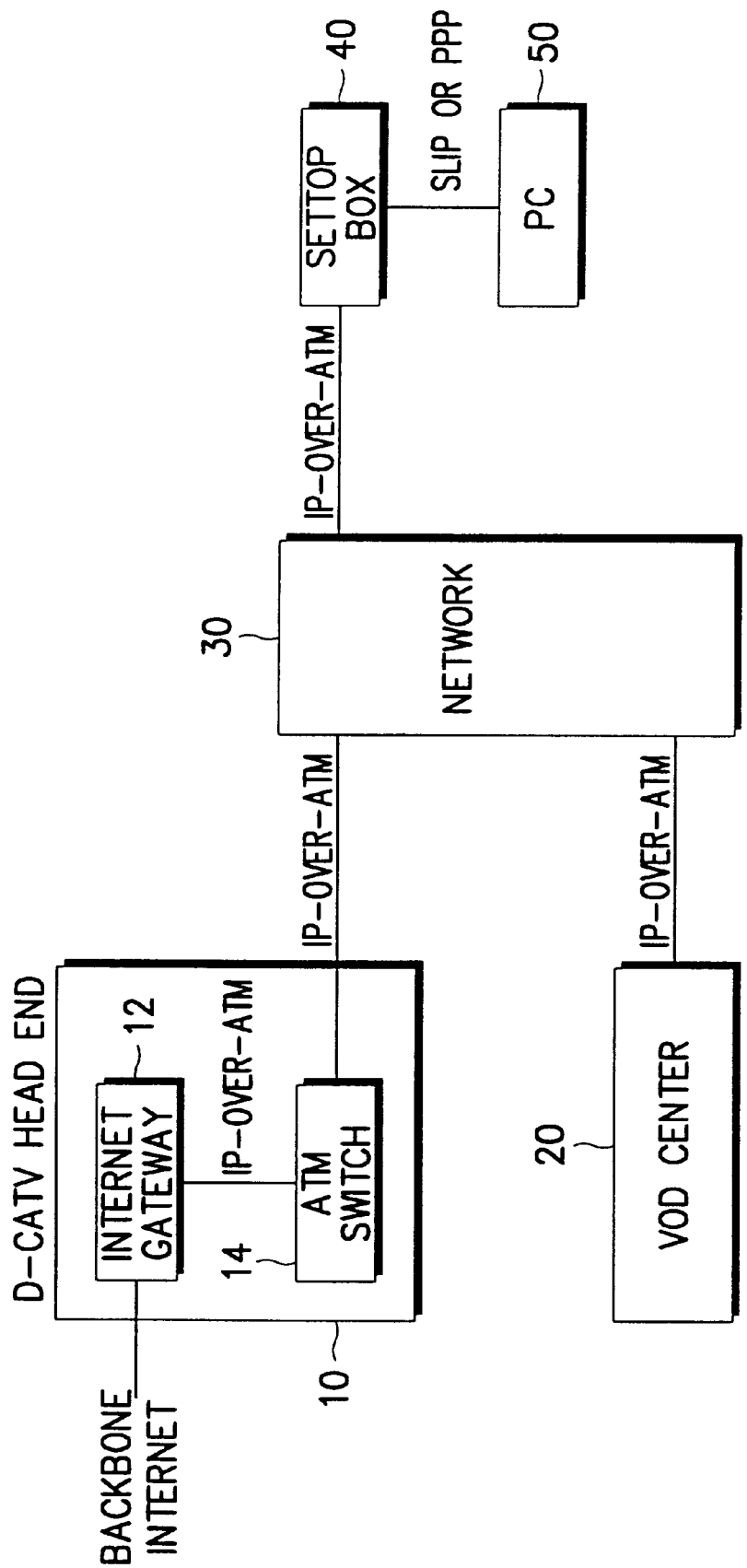
FIG. 1 shows a schematic block diagram of a D-CATV/VOD service system to which the present invention is applicable.
Figure 2:
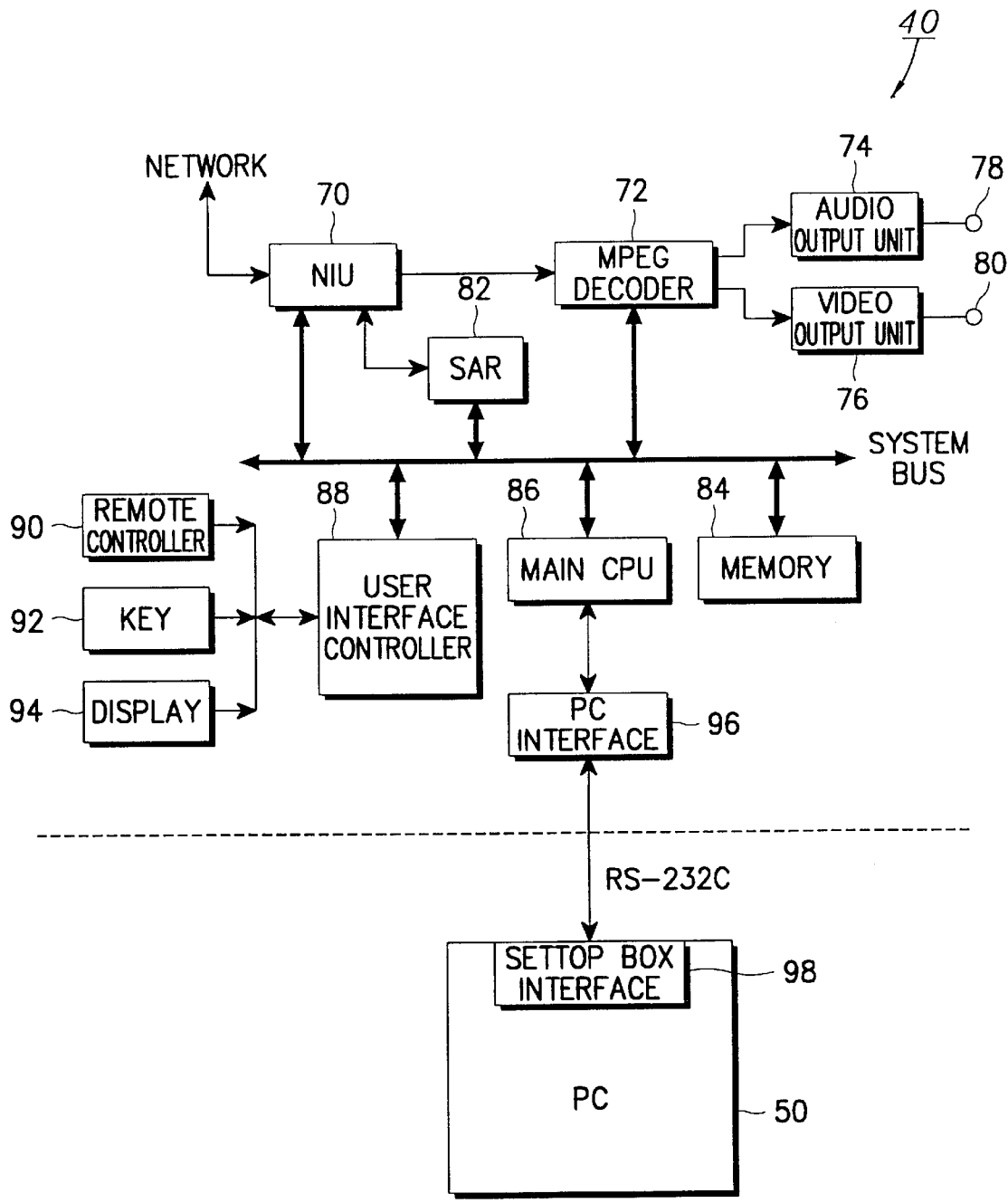
FIG. 2 shows a detailed block diagram of a settop box (40) and a PC (50) of FIG. 1 according to a preferred embodiment of the present invention.

A preferred embodiment of the present invention will be described in detail referring to the attached drawings, in which the like reference numerals denote the same elements in the drawings. Though the preferred embodiment is defined by specific and detailed circuit elements in order to provide an enabling disclosure of the present invention, one of ordinary skill would understand that the present invention may be implemented in a variety of embodiments on the basis of the description of the present invention. In addition, an unnecessary detailed description of known functions and constructions is avoided, as they would be well-known to one of ordinary skill in the art.

The present invention provides a PC communication and internet service at a transfer rate of both 57.6 Kbps and 115.2 Kbps, without requiring the use of any separate equipment. That is, in accordance with a preferred embodiment of the present invention, a standard telephone line may be used for voice communication, as it is, by connecting it to a settop box and a PC in a FTTC network such as a D-CATV network and a VOD service network. Further, the PC communication and internet service is available at a transfer rate of either 57.6 Kbps or 115.2 Kbps together with the D-CATV service, without a separate modem.

FIG. 1 shows a schematic block diagram of a system for providing VOD/D-CATV services, to which the present invention is applicable. With reference to FIG. 1, a network 30 is a D-CATV service network or a VOD service network such as the FTTC and HFC networks. Each of the D-CATV service network and the VOD service network form a bidirectional channel of the "IP over ATM" type. The D-CATV bidirectional signal channel is formed using the same IP over ATM procedure as that used for forming the bidirectional channel for the VOD service network. Preferably, the bidirectional channel for the VOD service network is used as it is.

A D-CATV head end 10 encodes both video data received from a satellite or terrestrial-based transmission and video data from a local program into an MPEG code. The head end 10 multiplexes the encoded MPEG code into a transport stream (TS) to transmit it to the network 30. In accordance with the present invention, the D-CATV head end 10 includes an internet gateway 12 for providing an internet service channel between a backbone internet and a D-CATV subscriber, and an ATM switch 14 for preparing for an increase in the number of subscribers. A VOD center 20 includes a video library for storing images, a video server, a data server, an ATM processor, and an ATM switch. Although not shown, the VOD center 20 may be directly connected to the backbone internet.

A settop box 40. is also connected to the network 30 via an IP over ATM bidirectional channel, and to a PC 50. However, the settop box 40 will communicate with shown) of the external unit (e.g., a TV). The SAR 82 disassembles a cell in a down-stream mode of operation, and assembles the disassembled cells in an up-stream mode of operation. The memory 84 includes a ROM (Read Only Memory) and a RAM (Random Access Memory). The ROM stores various control programs of the main CPU 86, and the RAM stores various data under the control of the main CPU 86.

The main CPU 86 controls the overall operation of the settop box 40. In accordance with the present invention, the main CPU 86 analyzes data received from the SAR 82 within a predetermined VC (Virtual Channel) cell for SLIP (Serial Line Internet Protocol), and transfers it to the PC interface 96 together with a SLIP header. Further, the main CPU 86 separates the SLIP header from the data received from the PC 50, and transmits the designated VC cell together with an IP-over-ATM header to the network 30 via the SAR 82 and the NIU 70. The user interface controller 88 controls the user interface, for example, the remote controller 90, the key 92, and the display 94, under the control of the main CPU 86. The PC interface 96 performs an RS-232C interfacing for communication with the PC 50, under the control of the main CPU 86.

The PC 50 includes therein a settop box interface 98 for communication with the settop box 40. The settop box interface 98 is a RS-232C interface of the type that is commonly installed in a PC. In the preferred embodiment of the present invention, a modem dial-up software included in Windows-95 is used for the settop box interface 98.

In accordance with the present invention, the settop box 40 and the PC 50 have inherent IP (Internet Protocol) addresses assigned thereto. Further, the settop box 40 receives the VC values for forming a channel to the internet gateway 12 by means of a conventional PVC (Permanent Virtual Circuit) or a SVC (Switch Virtual Circuit), not shown. The main CPU 86 of the settop box 40 controls the SLIP/PPP (Serial Line Internet Protocol/Point to Point Protocol) connection to process an IP packet of the PC 50 received through the PC interface 96 which is the RS-232C interface. In the meantime, the data having the other VC values such as the VOD channel are transferred to an application (for example, a VOD engine of the MPEG decoder 72) of the settop box 40 via an IP/TCP (Internet Protocol/Transmission Control Protocol) layer, under the control of the main CPU 86.

Now, a procedure for transmitting a packet from the PC 50 to the backbone internet will be described in detail. As described above, the settop box 40 and the PC 50 have inherent IP addresses and certain VC values for forming a channel to the internet gateway 12 in an initial state. The data (IP/TCP) generated at the PC 50 by the subscriber is transferred to the main CPU 86 of the settop box 40 via the settop box interface 98 in the PC 50, and the PC interface 96 in the settop box 40 by means of the RS-232C interface. The main CPU 86 includes an RS-232C port and supports a data transfer rate of 12 Kbps-115.2 Kbps. Thus, it is possible to support the data transfer rate of either 57.6 Kbps or 115.2 Kbps (which is a data transfer rate for the PC communication or internet service) according to the present invention. In this case, the settop box 40 should include a clock generator for providing the main CPU 86 with a clock of the corresponding data transfer rate. Therefore, the main CPU 86 separates the SLIP or PPP related header from the data transmitted from the PC 50 via the RS-232C port, and transmits the designated VC cell to the network 30 via the SAR 82 and the NIU 70 together with the IP-over-ATM header. As the data from the PC 50 is transmitted to the internet gateway 12 of the D-CATV head end 10 via the network 30, the internet gateway 12 analyzes the IP-over-ATM packet received at an ATM port, and converts the received IP-over-ATM packet into a general IP packet. Thereafter, the internet gateway 12 transfers the IP packet to the backbone internet by using an IP routing. Although the data from the PC 50 is transmitted to the internet gateway 12 of the D-CATV head end 10 via the network 30 in the above descriptions, the data can also be transmitted to VOD center 20, which also may be connected to the backbone internet. Further, a connection to the backbone internet may be attained by using another ATM port, for example, the ethernet. Finally, the procedure for transmitting the packet from the backbone internet to the PC 50 is a reverse of the procedure for transmitting the packet from the PC 50 to the backbone internet.

As can be appreciated from the foregoing descriptions, in accordance with the present invention, it is possible to provide the PC communication and internet service at the transfer rate of 57.6 Kbps or 115.2 Kbps by using the settop box without a separate equipment. Although the transfer rate of 57.6 Kbps or 115.2 Kbps according to the present invention is somewhat lower than that applicable when the ethernet interface or PC ATM interface is used, it is about two times higher than the maximum transfer rate (56 Kbps) of the existing modem. Further, since the additional equipment, such as the modem, ethernet interface card, and PC ATM interface card, are not necessary, the user may use the PC communication and internet service at the higher transfer rate at the lower cost.

As described hereinbefore, in accordance with the embodiment of the present invention, the FTTC network for the D-CATV and VOD services can provide a voice communication service via the telephone line by using the settop box and the PC, and provide the PC communication and internet service together with the D-CATV service at the transfer rate of 57.6 Kbps or 115.2 Kbps without a separate modem.

The preferred embodiment is given by way of example, and as a means for explaining the use and contruction of the present invention. The embodiment is subject to a modification by those of ordinary skill in the art. The present invention is not limited to the illustrative embodiments, but is defined by the appended claims.

What is claimed is:

1. A communications system comprising:
a back bone internet, a PC for providing communication and internet service, a network for D-CATV (Digital Cable Television) and VOD (Video-On-Demand) services; an internet gateway disposed at a head end of said D-CATV network to provide an internet service channel between said backbone internet and said D-CATV subscriber, and a settop box connected to said network, said settop box comprising:
a PC interface for enabling communication with said PC, and
a controller operative to analyze a previously designated VC (Virtual Channel) cell for a Serial Line Internet Protocol (SLIP) or Point to Point Protocol (PPP) within data received from said network and to transmit said VC cell together with a SLIP or PPP header, as applicable, to said PC, said controller being further operative to separate a SLIP or PPP header from the data received from said PC and to transmit to said network said designated VC cell together with an IP (Internet Protocol)-over-ATM (Asynchronous Transfer Mode) header.

2. A communication system for providing a PC communication and internet service according to claim 1, wherein said PC interface is structured to provide RS-232C communication with the PC.

3. A communication system for providing a PC communication and internet service according to claim 1, wherein said network is structured to form a bi-directional signal channel.

4. A communication system for providing a PC communication and internet service according to claim 1, wherein said settop box is structured to support a data transfer rate at least from 12 Kbps to 115.2 Kbps.

5. A communication system for providing a PC communication and internet service according to claim 1 wherein said D-CATV head end comprises an ATM switch, said switch being connected to said network by an IP-over-ATM link.

6. A communication system for providing a PC communication and internet service according to claim 1 further comprising a VOD center, said center being connected to said backbone internet and connected to said network by an IP-over-ATM link.

7. A communication system for providing a PC communication and internet service according to claim 1 wherein said settop box further comprises an MPEG decoder and audio/video outputs connected thereto.

8. A communication system for providing a PC communication and internet service according to claim 1 wherein said settop box and said PC have inherent Internet Protocol addresses assigned thereto.

9. A communication system for providing a PC communication and internet service according to claim 1 wherein said internet gateway is structured to analyze the IP over ATM packet and convert said packet into a general IP packet for transmission over said internet backbone.

10. A communication system for providing a PC communication and internet service according to claim 1 further comprising a separate ATM port, said port being connected to said backbone internet and connected to said network by an IP-over ATM link.

11. A settop box for providing, D-CATV (Digital Cable Television) and VOD (Video-On-Demand) services to the display of a D-CATV subscriber; and for providing communication and internet service between a back bone internet and a PC, where an internet gateway is disposed at a head end of said D-CATV network to provide an internet service channel between said backbone internet and said D-CATV subscriber; said settop box comprising
a network interface unit for connecting said settop box to said network;
a PC interface for enabling communication with said PC, and
a controller operative to analyze a previously designated VC (Virtual Channel) cell for a Serial Line Internet Protocol (SLIP) or Point to Point Protocol (PPP) within data received from said network and to transmit said VC cell together with a SLIP or PPP header, as applicable, to said PC, said controller being further operative to separate a SLIP or PPP header from the data received from said PC and to transmit to said network said designated VC cell together with an IP (Internet Protocol)-over-ATM (Asynchronous Transfer Mode) header.

12. A settop box for providing a PC communication and internet service according to claim 11, wherein said PC interface is structured to perform an RS-232C communication with the PC.

13. A settop box for providing a PC communication and internet service according to claim 11, wherein said network interface unit is structured to interface with a bi-directional signal channel.

14. A settop box for providing a PC communication and internet service according to claim 11, wherein said settop box supports a data transfer rate of 12 Kbps to 115.2 Kbps.

15. A settop box for providing a PC communication and internet service according to claim 11 further comprising an MPEG decoder and audio/video outputs connected thereto.

16. A method for providing a PC communication and internet service by using a settop box connected to a network for D-CATV (Digital Cable Television) and VOD (Video-on-Demand) services, comprising the steps of:
connecting a head end of said D-CATV and a center of said VOD to a backbone internet;

assigning inherent IP (Internet Protocol) addresses to the settop box and a PC connected to said settop box via an RS-232C interface;

analyzing a previously designated a VC (Virtual Channel) cell for Serial Line Internet Protocal (SLIP) out of data received from said network and transmitting said VC cell together with a SLIP header to said PC, and analyzing a previously designated VC cell received from said PC for a SLIP header, separating the SLIP header from the data received from said PC and transmitting to said network the designated VC cell together with an IP-over-ATM header.

17. A method for providing a PC communication and internet service according to claim 14, further comprising, providing an RS-232C communication between said settop and said PC.

* * * * *